United States Patent [19]

Sekmakas

[11] 4,076,677

[45] Feb. 28, 1978

[54] AQUEOUS COPOLYMER DISPERSIONS AND METHOD OF PRODUCING THE SAME

[75] Inventor: Kazys Sekmakas, Chicago, Ill.

[73] Assignee: DeSoto, Inc., Des Plaines, Ill.

[21] Appl. No.: 698,860

[22] Filed: Jun. 23, 1976

[51] Int. Cl.$^2$ ............................................. C08L 33/02
[52] U.S. Cl. ..................... 260/29.6 E; 260/29.6 N; 260/29.6 T; 260/29.6 AT; 260/29.6 TA
[58] Field of Search .................... 260/29.6 E, 29.6 N, 260/29.6 T, 29.6 AT, 29.6 TA

[56] References Cited

U.S. PATENT DOCUMENTS

| | | | |
|---|---|---|---|
| 3,118,848 | 1/1964 | Lombardi et al. | 260/29.6 E |
| 3,716,524 | 2/1973 | Cenci | 526/212 |
| 3,769,251 | 10/1973 | Wiest et al. | 260/29.6 T |
| 3,862,075 | 1/1975 | Sekmakas | 260/29.4 UA |

*Primary Examiner*—M. J. Welsh
*Attorney, Agent, or Firm*—Dressler, Goldsmith, Clement, Gordon & Shore, Ltd.

[57] ABSTRACT

Monoethylenic monomers, including from about 1 to about 30% by weight of monoethylenic carboxylic acid, are placed in solution in a liquid mixture preferably containing a low molecular weight polyhydric alcohol and an anionic surfactant and this liquid mixture is dispersed in water containing a $C_3$–$C_4$ alkanol and polymerized in the presence of an organic peroxide free radical polymerization catalyst at an elevated temperature, while agitating the dispersion. The dispersion of polymer particles is then at least partially neutralized, preferably with ammonia or an amine, to form an aqueous dispersion which is stable and which is useful in electrocoating.

14 Claims, No Drawings

AQUEOUS COPOLYMER DISPERSIONS AND METHOD OF PRODUCING THE SAME

The present invention relates to the production of aqueous copolymer dispersions which are particularly adapted for use in anodic electrodeposition processes.

In the conventional anodic electrodeposition process, a polycarboxylic acid resin is used which is usually a copolymer of monoethylenically unsaturated (monoethylenic) monomers formed by copolymerization in organic solvent solution. The resulting copolymer solution is dispersed in an aqueous medium with the aid of a base which is usually an amine, and a unidirectional electrical current is passed through the water dispersion to cause the electrodeposition of the copolymer on a conductive substrate which is the anode of the electrical system.

The conventional anodic electrodeposition system described above possesses several inadequacies and one or more of these can be mitigated using the aqueous copolymer dispersions of this invention.

One difficulty is the appearance of a defect known as cratering in the final electrocoated products. Contaminants such as oil, grease, or dirt can be present on the substrate being coated. The solution copolymers are of low molecular weight as a result of the copolymerization process in organic solvent solution. These low molecular weight copolymers do not adequately cover the contaminated areas, and unsightly craters in the final cured coating are the result. It has been found that the addition of relatively small proportions of the higher molecular weight aqueous copolymer dispersions of this invention to the existing aqueous electrocoating bath provides improved cratering resistance.

Another difficulty is the need to convert the organic solvent solutions in which the carboxylic acid copolymers are formed to aqueous dispersions suited for addition to the aqueous electrocoating bath. This is frequently carried out at the electroplating site, and it is sometimes carried out at the time of addition. In this invention, the carboxylic acid copolymer is formed directly in water so that the operation of placing it in water is eliminated.

The low molecular weight of the solution copolymers normally used also limits the performance characteristics of the cured coatings which are produced. Replacement of these solution copolymers with the higher molecular weight polymer emulsions of this invention provides coatings which exhibit better performance. Film hardness and flexibility are particularly improved.

It is noted that this invention is an improvement over the aqueous copolymer dispersions disclosed in my U.S. Pat. No. 3,862,075, granted Jan. 21, 1975, and also in my prior copending application Ser. No. 585,039, filed June 9, 1975, now U.S. Pat. No. 4,005,052, granted Jan. 25, 1977. In these prior disclosures organic peroxides can be used as the polymerization catalyst, but the polymerization is inadequate because the peroxides are not very effective catalysts in water, so persulfates and similar water soluble catalysts are preferred, and this causes the resulting emulsion to contain ions which interfere with anodic electrodeposition, as by excessively increasing the conductivity of the electrocoating bath, and these ions are not easily removable.

In accordance with this invention, monoethylenic monomers including from about 1 to about 30% by weight of monoethylenic carboxylic acid, are copolymerized in an aqueous medium containing from about 15–40%, preferably from 20–35%, of a propanol or a butanol or a mixture thereof, based on the weight of the aqueous medium and the presence of these alcoholic solvents permits an organic peroxide to be used as the polymerization catalyst with excellent conversion of monomer to polymer. When a polyhydric alcohol is present as in my said patent and prior application, then the result is an emulsion which can be diluted, pigmented or not as desired, and used directly for anodic electrocoating. When the above-noted polyhydric alcohol is omitted, the result is a colloidal dispersion which is excellently suited for incorporation in conventional anodic electrodeposition processes to mitigate the cratering problem which is present to at least some extent in the usual electroplating baths which contain solution copolymers.

The proportion of the alcoholic solvent is important. When there is too much alcoholic solvent, the polymer particles dissolve, and this changes the polymerization completely and prevents the achievement of satisfactory molecular weight. Also, the product produced in this way is too viscous. When there is too little alcoholic solvent, the polymer particles tend to precipitate and the organic peroxide catalyst is not very effective.

Referring first to the disclosure of my U.S. Pat. No. 3,862,075, monoethylenic monomers, including from about 1% to about 30% by weight of monoethylenic carboxylic acid, are placed in solution in a liquid mixture containing a low molecular weight polyhydric alcohol. This liquid mixture is dispersed in water and polymerized at an elevated polymerization temperature using agitation in the presence of a free radical polymerization catalyst to form a dispersion of copolymer particles which is then at least partially neutralized, preferably with ammonia or an amine, to form an aqueous dispersion which is stable in the absence of emulsifying agent and which is useful in coating.

In accordance with the disclosure of said application Ser. No. 585,039, the water insoluble polyhydric alcohol component of U.S. Pat. No. 3,862,075 is combined in the liquid mixture with a small proportion of a water soluble anionic surfactant. The anionic surfactant causes the particle size in the emulsion to be finer and more uniform which leads to coatings having improved water resistance and improved gloss.

The monoethylenic monomers which are employed are subject to wide variation, all of the monomers customarily employed in acrylic copolymers being broadly useful herein. Thus, vinyl aromatic monomers, such as styrene and homologs thereof, such as vinyl toluene are highly useful herein, it being customary to balance such monomers which provide hard polymers when homopolymerized with alkyl acrylates and methacrylates containing 2 or more carbon atoms in the alkyl group and which provide soft polymers when homopolymerized. Among the monomers which are particularly useful herein, in addition to those noted hereinbefore, are methyl methacrylate and acrylonitrile. Esters of acrylic acid or crotonic acid are particularly desirable such as ethyl acrylate, 2-ethylhexyl acrylate, dodecyl acrylate, butyl crotonate, and the like. Up to about 20% of total monomers may be polyethylenically unsaturated polyester as disclosed in U.S. Pat. No. 3,163,615.

It is important that from about 1–30%, based on the weight of polymerizable monomers, be constituted by monoethylenic carboxylic acids. These are illustrated by acrylic acid, methacrylic acid, crotonic acid, maleic acid, fumaric acid, monobutyl maleate, and the like. Preferred proportions of the monoethylenic carboxylic acid are from 3–20%, on the same basis. If the acid is omitted, stability of the dispersion during polymerization and thereafter is unsatisfactory.

Other monomers of diverse type which may be included are described in my U.S. Pat. No. 3,862,075. Reactive monomers such as hydroxy monomers (2-hydroxyethyl acrylate), amide monomers (acrylamide), N-methylol amide monomers (N-methylol acrylamide), and amine monomers (dimethyl amino methacrylate) are useful herein in amounts up to about 20%, based on the weight of polymerizable monomers.

With usual monomer balances, the films are relatively soft and highly flexible, but monomer selection can be used to provide harder polymers of higher glass transition temperature. In normal practice in this invention, monomers are selected to provide a glass transition temperature of at least about 30° F. Also, a water dispersible aminoplast or phenoplast resin is preferably added to the dispersions of this invention, providing a curing potential for the formation of films of increased hardness and solvent resistance.

Referring to the polyhydric alcohols which are optionally utilized herein, water insoluble tri- and tetrahydric alcohols having a molecular weight of from about 300 up to about 6000 are contemplated. Polyethers formed by the reaction of propylene oxide with the trihydric or tetrahydric alcohol are particularly contemplated. Particularly preferred products are polyoxypropylene derivatives of glycerin, trimethylol propane, hexanetriol, or pentaerythritol having a molecular weight in the range of from 350 to 5000. The triols formed by adducting propylene oxide with trimethylol propane are available in commerce, and the product with an average molecular weight of about 2540 will be used as illustration.

Caprolactone derivatives of the same polyhydric alcohols are also useful, particularly epsilon caprolactone derivatives of pentaerythritol or trimethylol propane.

The optional polyhydric alcohol referred to hereinbefore is employed in an amount of at least about 0.5%, preferably at least 2%, based on the weight of the materials which are to be copolymerized. These materials are ethylenically unsaturated and consist essentially of monoethylenic monomers which are preferably free of any functional group which is reactive, under the conditions of polymerization, with the hydroxy groups in the polyhydric alcohol. Thus, carboxy and hydroxy functionalities are inert herein and amide, amine and N-methylol functionality are easily tolerated. Somewhat larger amounts of polyhydric alcohol can be used, e.g., 15 to 20%, and even larger amounts up to about 50% may be employed though this is not preferred. From 3–12% of polyhydric alcohol represents preferred practice.

It is also permissible to employ an anionic surfactant for particle size control as in said application Ser. No. 585,039, but very little is needed, e.g., from about 0.1–5%, preferably 0.2–1%, based on material being polymerized. Anionic surfactants as a class are well known, and are illustrated by sodium dioctyl sulfosuccinate, sodium dodecyl hydrogen phosphate, sodium methyl naphthalene sulfonate, sodium lauryl sulfate and sodium-2-acetamidohexadecane-1-sulfonate.

The monoethylenic monomers are combined with the polyhydric alcohol which is present to form a liquid mixture. The liquid nature of the mixture permits the same to be broken up by agitation with water containing alcoholic solvent in the reactor to thereby obtain the desired particle size, e.g., 0.1–5 micron. These smaller particles are formed when anionic surfactant is present in the aqueous phase. Some of the monoethylenic monomers are themselves liquid, such as styrene, and the use of liquid monomer eases the burden of obtaining the desired liquid mixture.

The polymerization which is employed in this invention is a simple one. The liquid mixture of monoethylenic monomers (polyhydric alcohol, also being present if used) is simply dispersed in water containing the solvent, and anionic surfactant, if used. The monomers are added with vigorous agitation and moderate heat is employed to cause the organic peroxide free radical polymerization catalyst to release free radicals and stimulate or initiate the desired polymerization.

The catalyst may be benzoyl peroxide or tertiary butyl perbenzoate or the like, and it may be incorporated in either the liquid mixture of monomers, or the water phase, or both as desired. It can also be added to the polymerization mixture in increments.

Catalyst proportion (0.1–5% of monomers) and reaction temperature (liquid phase preferably at 50° C. or higher, more usually 75–100° C.) are both conventional. The polymerization is desirably carried out at a solids content of from 5–60%, more usually 30–55%.

After the polymerization reaction is completed, the acidic copolymer is desirably at least partially neutralized for storage stability, but the need for neutralization is minimized when anionic surfactant is present. The final, at least partially neutralized copolymer dispersion, in the form used for electrocoating, desirably has a pH in the range of pH 5–11, more preferably pH 6.5–9.0. Final solids in the electrocoating bath are desirably in the range of from 2–20%, preferably 3–15%. At a given solids content, viscosity increases with pH so partial neutralization can be used to control viscosity. At least 5% neutralization, preferably 10–30% neutralization, helps to provide minimum viscosity for processing, e.g., filtration and pigmentation. More extensive neutralization is preferred for greater stability and for electrocoat application.

The aminoplast resins which are desirably utilized herein are those which can be stably dispersed in water, and these are more fully illustrated in my said U.S. Pat. No. 3,862,075.

While about 2–40% of the aminoplast resin, based on the total weight of resin, is broadly useful, preferred proportions are from 5–25%. Water dispersible phenolic resins (phenoplasts) are also useful instead of or together with the aminoplast resin.

From the standpoint of cure, curing temperatures range from about 200° to 550° F. for periods of time ranging from about an hour at the lowest temperature to about 30 seconds at the highest temperature. Preferred baking temperatures are from 300° F. to 450° F.

The alcoholic solvents and their proportion of use have been specified hereinbefore. The useful alcohols are the $C_3$ and $C_4$ alkanols, preferably n-butanol, isobutanol, n-propanol and isopropanol. A small proportion of a $C_2$–$C_4$ glycol, such ethylene or propylene glycol, may also be present to somewhat reduce the proportion of alcohol which is needed.

It is noted in passing that alcoholic solvents are sometimes added to aqueous polymer dispersions to aid coalescence of the polymer particles after application to a substrate. For this different purpose one would use up to about 5% of alcohol based on the volatile portion of the dispersion, which is much less than is needed in this invention.

When the aqueous dispersions of this invention are added to conventional anodic electrocoating baths, they are introduced in an amount of about 0.25-10%, preferably from 0.5-3%, based on the weight of resin in the bath. As will be appreciated, the conventional anodic electrocoat bath is constituted by organic solvent-soluble carboxyl-functional resin dispersed in water with the aid of a base and from 10-50% by weight, based on the weight of the polymer, of water-soluble organic solvent illustrated by 2-butoxy ethanol, 2-ethoxy ethanol or dioxane. The carboxy-functional resins are illustrated by solution copolymers of monoethylenic monomers having an acid number of from 15 to 300, preferably from 40-100. These conventional anodic systems are more fully illustrated in the following United States patents, namely, patents 3,516,913 and 3,865,771.

This invention is illustrated in the following examples.

EXAMPLE 1

Butanol: 125 g
Deionized water: 250 g
Benzoyl peroxide: 2.5 g
Anionic surfactant*: 10 g
* Alcolac product Sipex DS-10 is used in all Examples herein.

Charge to reactor and heat to 70° C. with agitation.
Isobutyl acrylate: 150 g
Ethyl acrylate: 215 g
Hydroxy ethyl acrylate: 100 g
Acrylic acid: 2.5 g
Premix monomers and catalyst to form a liquid mixture and add to reactor with agitation over a 3 hour period at 75°-77° C. Hold for 1 hour.

Tertiary-butyl perbenzoate: 1.5 g — add and hold for 1 hour
Deionized water: 200 g — Cool to 35° C. and add over a 15 minute period.
Diisopropanol amine: 37 g — add with above water
Deionized water: 155 g — add over a 15 minute period and cool.

The product is an aqueous dispersion of colloidal particle size, but the molecular weight is higher than is obtained by conventional solution copolymerization. The addition of 2%, based on the weight of polymer solids, of the product of this example to an aqueous anodic electrocoating bath at 9% solids and containing the polymer of Example 6 of U.S. Pat. No. 3,516,913 (using 25% of total resin of American Cyanamid Product XM 1116 described hereinafter as the aminoplast curing agent) acts to improve the crater resistance of the electrodeposited coating.

EXAMPLE 2

Butanol: 125 g
Deionized water: 250 g
Benzoyl peroxide: 2.5 g
Anionic surfactant of Ex. 1: 10 g
Charge to reactor and heat to 75° C. with agitation.
Triol (see note 1): 27 g
Isobutyl acrylate: 150 g
Ethyl acrylate: 215 g
Hydroxy ethyl acrylate: 100 g
Acrylic acid: 35 g
Benzoyl peroxide: 2.5 g
Premix polyol and monomers to provide a liquid mixture and add with agitation to reactor over a 3 hour period at 75°-77° C. Hold for 1 hour.

Tertiary-butyl perbenzoate: 1.5 g — add catalyst and hold for 1 hour at 77° C.
Deionized water: 200 g
Diisopropanol amine: 37 g
Cool to 35° C. and add water and amine.
Deionized water: 155 g — add water.

Note 1 — propylene oxide adduct of trimethylol propane having an average molecular weight of about 2540.

The product is a partially neutralized milky dispersion having a solids content of 41.2%. It is directly useful for maintaining the solids content of an electrocoating bath at a desired solids content, e.g., 9% by weight. The dispersion is fully neutralized by the excess amine present in the electrocoating bath. The product may be pigmented as desired by simply grinding in the desired pigment, e.g., titanium dioxide rutile. The pigment is ground in at a solids content of 41.2%. In the initial charge to the electrocoating bath, the product is diluted and fully neutralized with diisopropanol amine. The electrocoating bath includes 25%, based on the total weight of resin, of American Cyanamid XM 1116, which is a methylated, ethylated, hexamethylol melamine.

When the dispersion of this example is used to electrocoat coil, e.g., aluminum coil, using an aminoplast curing agent, the cure is faster and the coatings are harder and more flexible than if the same monomers were copolymerized in organic solvent to form the copolymer vehicle of the electrocoating bath. The higher molecular weight of the wet electrodeposited film provides other benefits as well. Thus, the wet-coated coils must be carried by rollers, and there is less damage from roller contact. Also, it is sometimes desired to mechanically overcoat the wet-coated surface and then bake the two coatings at the same time, and the higher molecular weight helps the electrodeposited prime coat to receive the topcoat under these circumstances regardless of whether the topcoat is organic solvent-based or water-based.

The invention is defined in the claims which follow.

I claim:

1. A method of producing a dispersion of copolymer particles in water which is adapted for use in electrocoating comprising, forming a liquid mixture consisting essentially of monoethylenic monomers including from about 1% to about 30% by weight of monoethylenic carboxylic acid, dispersing said liquid mixture in water containing from about 15-40% of a $C_3$-$C_4$ alkanol, based on the weight of the aqueous medium, to form a dispersion, polymerizing said dispersion in the presence of an organic peroxide polymerization catalyst at an elevated temperature, while agitating the dispersion, to form copolymer particles dispersed in the aqueous alcohol-containing medium.

2. A method as recited in claim 1 in which said dispersion includes from about 0.1-5% of anionic surfactant, based on the material being polymerized.

3. A method as recited in claim 1 in which said liquid mixture of monomers includes from about 0.5% up to about 50% based on the weight of said monomers, of water insoluble trihydric or tetrahydric alcohol having a molecular weight of from 300 up to about 6000.

4. A method as recited in claim 3 in which said liquid mixture of monomers includes from 2 to 20% of said trihydric or tetrahydric alcohol and said dispersion includes 0.1–1% of anionic surfactant, based on the material being polymerized.

5. A method as recited in claim 4 in which said alkanol is n-butanol.

6. A method as recited in claim 4 in which said alkanol is isopropanol.

7. A method as recited in claim 1 in which said dispersion is stabilized by neutralization with an amine and neutralization is carried out to provide a dispersion having a pH in the range of 5–11.

8. A method as recited in claim 1 in which said monoethylenic monomers further include from about 1 to 20% of monoethylenic monomer having hydroxyl functionality as its sole reactive group.

9. A method as recited in claim 3 in which said trihydric or tetrahydric alcohol is a polyether derivative of glycerin, trimethylol propane, hexanediol or pentaerythritol.

10. A method as recited in claim 9 in which said polyhydric alcohol is a polyoxypropylene derivative.

11. A method as recited in claim 10 in which said polyoxypropylene derivative has a molecular weight in the range of from 350 to 5,000.

12. A method as recited in claim 4 in which said polyhydric alcohol is employed in an amount of from 3–12% and said monoethylenic carboxylic acid is present in an amount of from 3–20% of the weight of monoethylenic monomers.

13. A method as recited in claim 1 in which said monoethylenic monomers include up to about 20% of monomers which carry functional groups selected from the hydroxy group, the amido group, the methylol group, and the amino group.

14. The product of the method of claim 1.

* * * * *